United States Patent
Kim et al.

(10) Patent No.: US 10,411,875 B2
(45) Date of Patent: Sep. 10, 2019

(54) HYBRID TYPE TRANSCEIVER FOR BROADBAND LARGE AREA BEAMFORMING

(71) Applicant: Korea Electronics Technology Institute, Seongnam-si (KR)

(72) Inventors: Ki Jin Kim, Yongin-si (KR); Kwang Ho Ahn, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 16/180,487

(22) Filed: Nov. 5, 2018

(65) Prior Publication Data

US 2019/0158267 A1 May 23, 2019

(30) Foreign Application Priority Data

Nov. 20, 2017 (KR) ........................ 10-2017-0154526

(51) Int. Cl.
| H04L 7/02 | (2006.01) |
| H04B 1/38 | (2015.01) |
| H01Q 3/26 | (2006.01) |
| H01Q 3/38 | (2006.01) |
| H01Q 21/00 | (2006.01) |

(52) U.S. Cl.
CPC ............ *H04L 7/02* (2013.01); *H01Q 3/2676* (2013.01); *H01Q 3/2682* (2013.01); *H01Q 3/38* (2013.01); *H04B 1/38* (2013.01); *H01Q 21/00* (2013.01)

(58) Field of Classification Search
CPC ............ H04L 7/02; H04B 1/38; H01Q 21/00
See application file for complete search history.

(56) References Cited

U.S. PATENT DOCUMENTS

| 5,783,977 | A  | * | 7/1998  | Chethik  | H03H 17/0294 |
|           |    |   |         |          | 324/616 |
| 8,593,219 | B1 | * | 11/2013 | Root     | H03F 1/0288 |
|           |    |   |         |          | 330/124 R |
| 10,056,922 | B1 | * | 8/2018  | Tsvelykh | H04B 1/04 |
| 10,211,902 | B1 | * | 2/2019  | Iannotti | H04B 7/0671 |
| 2003/0227353 | A1 | * | 12/2003 | Fayyaz | H01P 1/185 |
|           |    |   |         |          | 333/161 |

(Continued)

FOREIGN PATENT DOCUMENTS

| WO | WO 2014/142885 A1 | 9/2014 |
| WO | WO 2017/153985 A1 | 9/2017 |

OTHER PUBLICATIONS

Korean Office Action dated Nov. 28, 2018 in counterpart Korean Patent Application No. 10-2017-0154526 (7 pages in Korean).

*Primary Examiner* — Lewis G West
(74) *Attorney, Agent, or Firm* — NSIP Law

(57) ABSTRACT

A hybrid type transceiver for broadband large area beamforming is provided. A communication device includes: antennas; first phase shifters (PSs) configured to adjust respective phases of reception signals received via the antennas; and a first time delay (TD) configured to adjust delays for the reception signals the phases of which are adjusted at the first PSs. Accordingly, in designing a broadband communication system using a large area array antenna, the structure of the system can be simplified, a size can be reduced, power consumption can be reduced, and a resolution of the system can be enhanced.

19 Claims, 11 Drawing Sheets

(56) References Cited

U.S. PATENT DOCUMENTS

| | | | |
|---|---|---|---|
| 2011/0074479 A1* | 3/2011 | Yun | H03L 7/0814 327/158 |
| 2014/0155003 A1* | 6/2014 | Nakatani | G01K 7/21 455/90.2 |
| 2018/0131102 A1* | 5/2018 | Wang | H01Q 3/38 |
| 2018/0375487 A1* | 12/2018 | Chen | H03H 7/325 |

* cited by examiner

Block view | Architectural view

HYBRID TYPE TRANSCEIVER FOR BROADBAND LARGE AREA BEAMFORMING

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Nov. 20, 2017, and assigned Serial No. 10-2017-0154526, the entire disclosure of which is hereby incorporated by reference.

TECHNICAL FIELD OF THE INVENTION

The present disclosure relates generally to a transceiver, and more particularly, to a transceiver for broadband large area beamforming.

BACKGROUND OF THE INVENTION

FIG. 1 is a view illustrating delays of signals entering at an angle of θ via array antennas of a radio frequency (RF) or millimeter wave transception system. The time delay between adjacent antennas in FIG. 1 is "d*sin θ."

When it is assumed that there is no loss caused by wave propagation between antennas, a time delay between the first antenna and the (N+1)-th antenna is "N*d*sin θ."

Accordingly, in order to transmit or receive radio signals in a desired direction in the system illustrated in FIG. 1, a controller for delaying time as much as "N*d*sin θ" is required.

FIG. 2 is a circuit diagram of a delay device using an optical delay. The illustrated delay device has an advantage of making a delay exactly without a loss, but requires an E/O converter for converting an electric signal into an optical signal, and an O/E converter for converting an optical signal into an electric signal.

Accordingly, there are problems that the delay device has a large volume, and the number of E/O converters and O/E converters geometrically increases and the cost increases as electric signals become faster.

FIGS. 3A and 3B are views illustrating a circuit of a millimeter wave delay device using an electronic time delay (ETD). The time delay may be adjusted by an inductor and a capacitor, and a switch is disposed at each node to adjust the time delay.

This technique has advantages in terms of size and speed, but cannot be applied to a large area array system requiring much delay time due to a problem that a loss and a size increase as delay time increases.

FIG. 4 is a view illustrating an array antenna system using a phase adjuster. A time delay (Td) is converted into $e^{-jwTd}$ by Fourier transform, and the time delay may be equivalent to a phase delay. That is, since even a long TD may be easily expressed by a phase delay, a large area array can be easily configured when the phase adjuster controllable as shown in FIG. 4 is selected as a structure for the array system.

However, in a phase conversion array system configured by modeling a time delay as a phase delay, there is a limit to transception communication and a radar signal bandwidth. This is because a phase delay and a time delay maintain an equivalent relation therebetween only in a narrow band frequency. Recent communication systems desire to support high-speed communication services using broadband frequencies, and a problem may arise in that case.

FIGS. 5 and 6 illustrate this problem. FIG. 5 is a view illustrating gain waveforms when broadband signals reaching 9-11 GHz are transmitted at an angle of 20 degrees by using a real time delay device. As shown in FIG. 5, it can be seen that beamforming is completely performed over all bands including 9-11 GHz.

However, when the same system is implemented by using a phase adjuster as shown in FIG. 6, beamforming of 10 GHz is performed at an angle of 20 degrees, but beamforming of 9 GHz is performed at an angle of 18 degrees, and beamforming of 11 GHz is performed at an angle of 22 degrees. Therefore, there is a variation in transmission output at the desired angle of 20 degrees according to frequencies. This is called a beam squint phenomenon, which is the most serious problem that occurs in transmitting broadband signals using a phase adjuster.

SUMMARY OF THE INVENTION

To address the above-discussed deficiencies of the prior art, it is a primary aspect of the present disclosure to provide a hybrid type transceiver for broadband large area beamforming.

According to an embodiment of the present disclosure to achieve the above-described aspects, a communication device includes: antennas; first phase shifters (PSs) configured to adjust respective phases of reception signals received via the antennas; and a first time delay (TD) configured to adjust delays for the reception signals the phases of which are adjusted at the first PSs.

The first PSs may be provided at an RF terminal to adjust respective phases of received RF signals.

The communication device according to the present embodiment may further include a first synthesizer configured to synthesize the RF signals, and the first TD may be configured to adjust a delay for a synthesis signal synthesized at the first synthesizer.

The communication device according to the present embodiment may further include a first mixer configured to down-convert the synthesis signal outputted from the first synthesizer into an IF band signal, and the first TD may be configured to adjust a delay for the IF band signal outputted from the first mixer.

An adjustment width at the first TD may be larger than adjustment widths at the first PSs.

The communication device according to the present embodiment may further include: a second TD configured to adjust delays for transmission signals; and second PSs configured to adjust respective phases of a plurality of transmission signals generated from the transmission signals, and to apply the transmission signals to the antennas.

The second TD may be provided at an IF terminal to adjust a delay for an IF signal to be transmitted, and the communication device may further include a mixer configured to up-convert the IF signal the delay of which is adjusted at the second TD into an RF signal.

The communication device according to the present embodiment may further include a distributor configured to distribute the RF signal outputted from the mixer into a plurality of RF signals, and the second PSs may be configured to adjust respective phases of the RF signals outputted from the distributor, and to apply the RF signals to the antennas.

The antenna may be configured to form an array antenna.

According to another embodiment of the present disclosure, a communication method includes: receiving, by antennas, signals, respectively; adjusting, by first PSs, respective phases of reception signals received via the antennas; and adjusting, by a first TD, delays for the reception signals the phases of which are adjusted at the first PSs.

According to still another embodiment of the present disclosure, a communication device includes: PSs configured to adjust respective phases of reception signals; and a TD configured to adjust delays for the reception signals the phases of which are adjusted at the PSs.

According to yet another embodiment of the present disclosure, a communication method includes: adjusting, by first PSs, respective phases of reception signals; and adjusting, by a first TD, delays for the reception signals the phases of which are adjusted at the PSs.

According to embodiments of the present disclosure as described above, in designing a broadband communication system using a large area array antenna, the structure of the system can be simplified, a size can be reduced, power consumption can be reduced, and a resolution of the system can be enhanced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Hereinafter, the present disclosure will be described in more detail with reference to the accompanying drawings.

Figure 1:
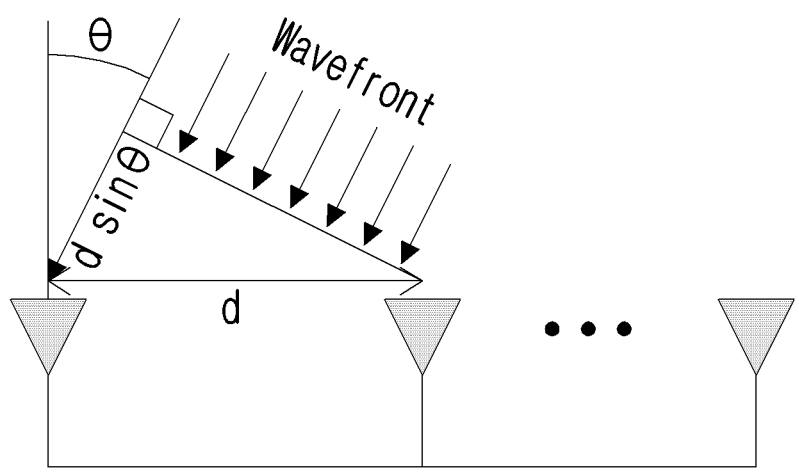
FIG. 1 is a view illustrating array antennas for receiving signals at an angle of θ.
Figure 2:
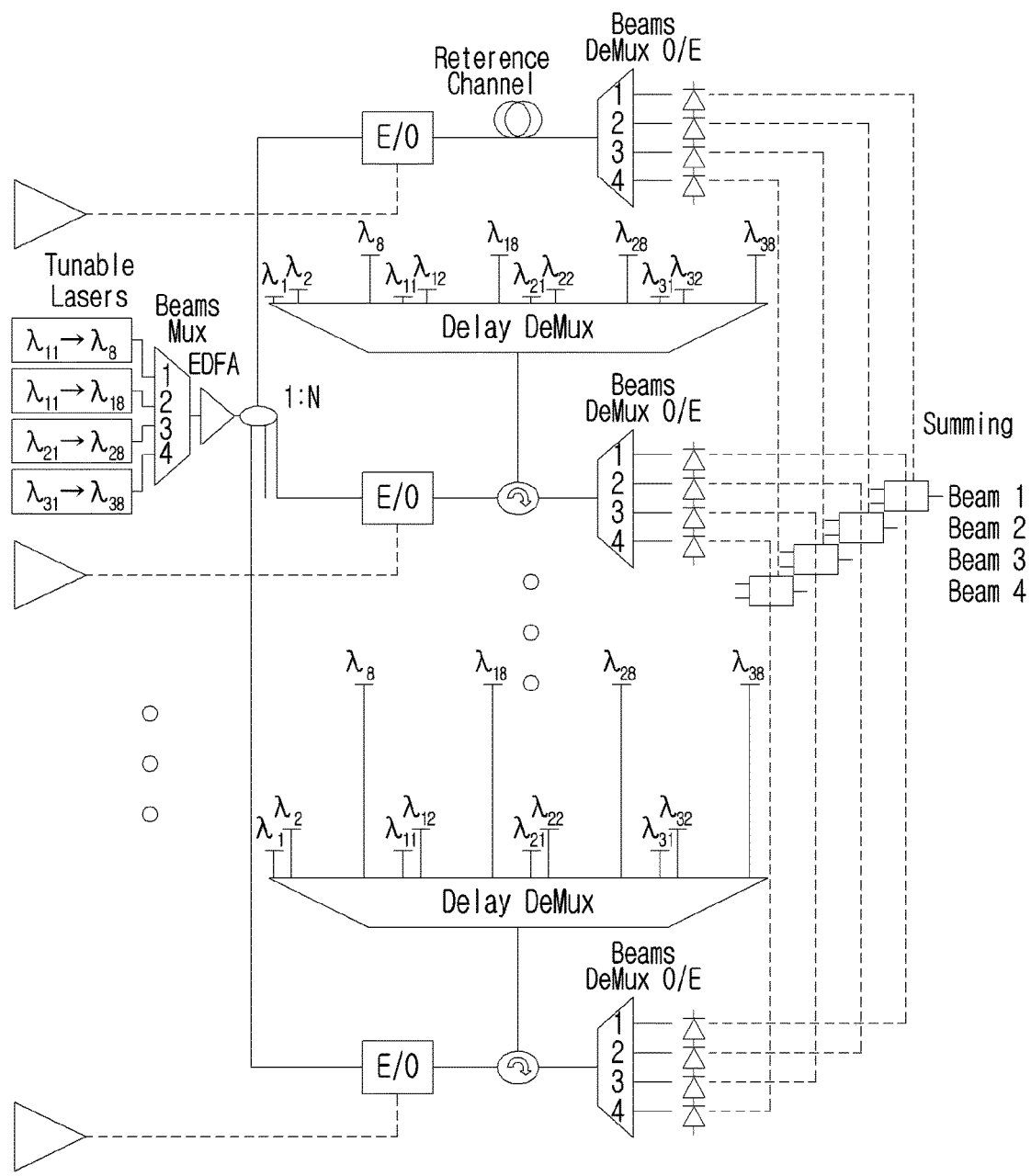
FIG. 2 is a circuit diagram of a delay device using an optical delay.
Figure 3A:
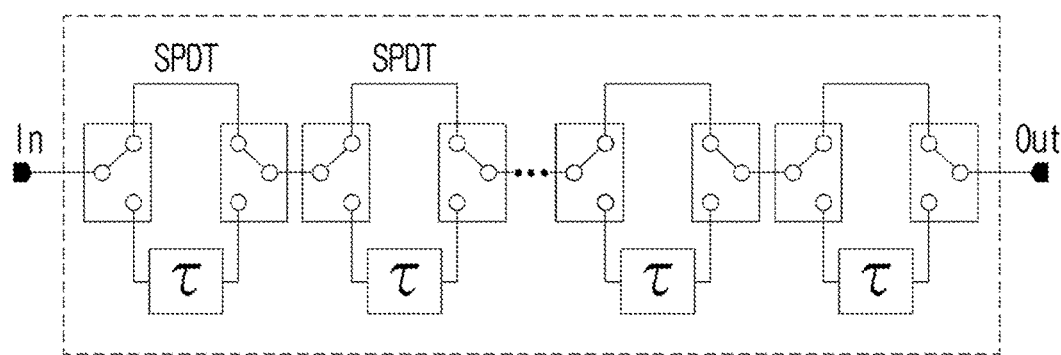
FIGS. 3A and 3B are circuit diagrams of an ETD.
Figure 3B:
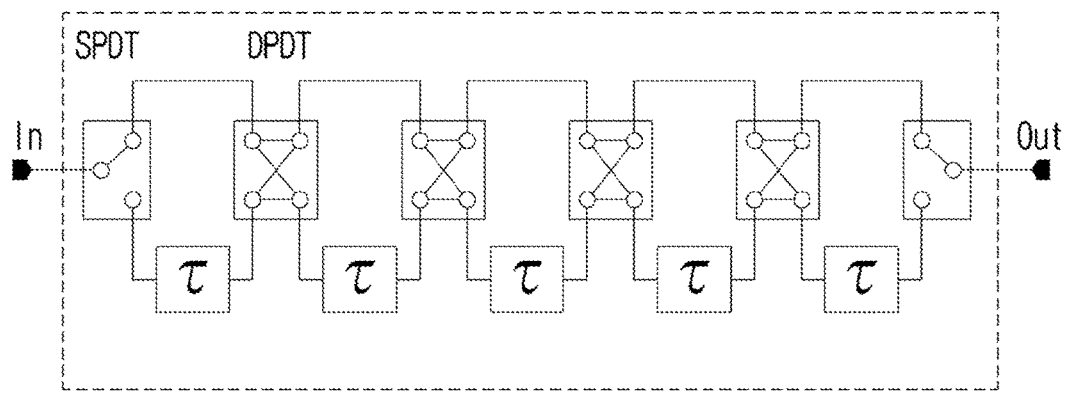
Figure 4:
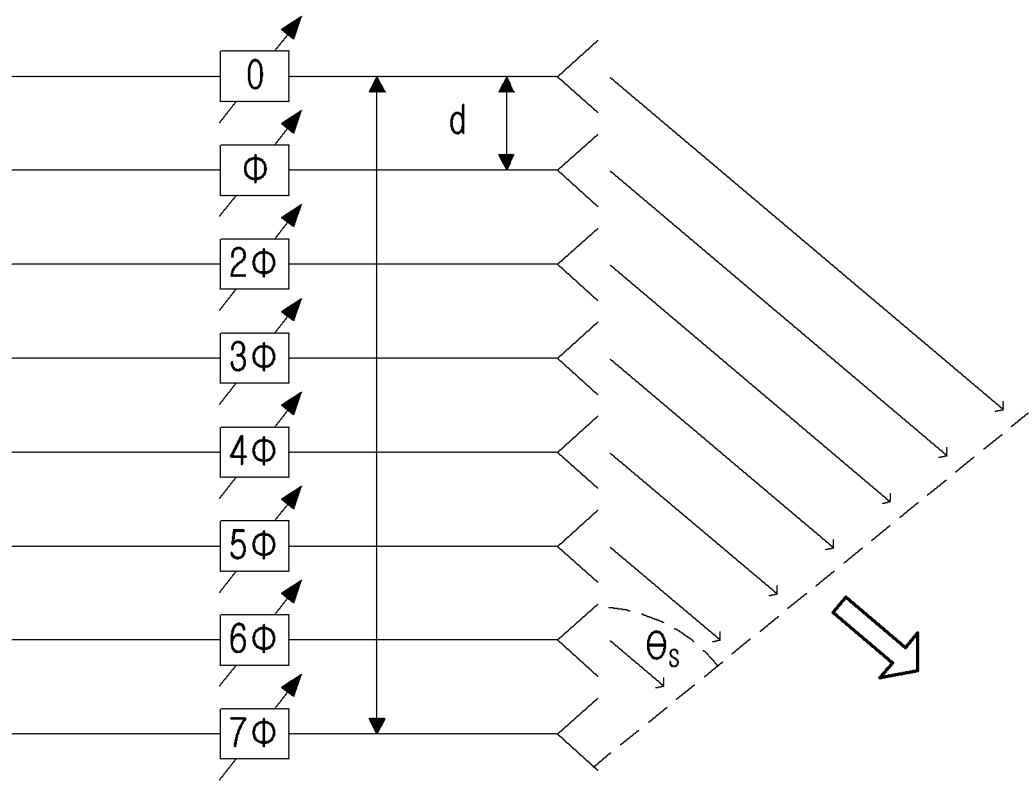
FIG. 4 is a view illustrating an array antenna system using a phase adjuster.
Figure 5:
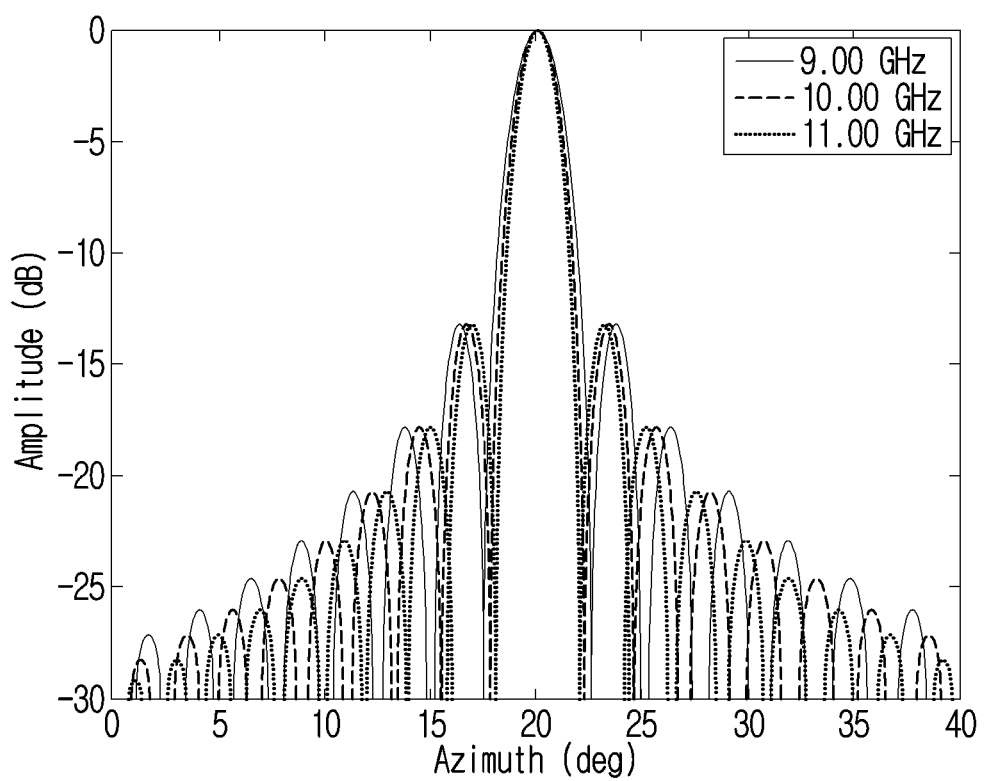
FIG. 5 is a view illustrating patterns of optical band signals beamformed at 20 degrees by using a time delay device.
Figure 6:
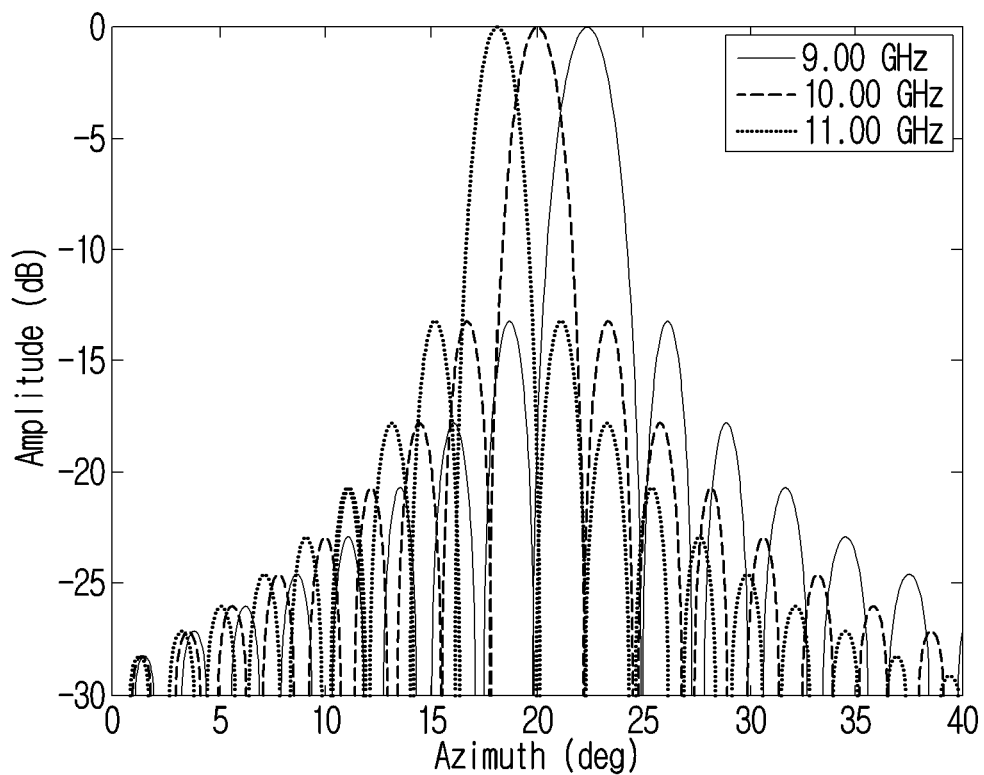
FIG. 6 is a view illustrating patterns of optical band signals beamformed at 20 degrees by using a phase adjuster.
Figure 7:
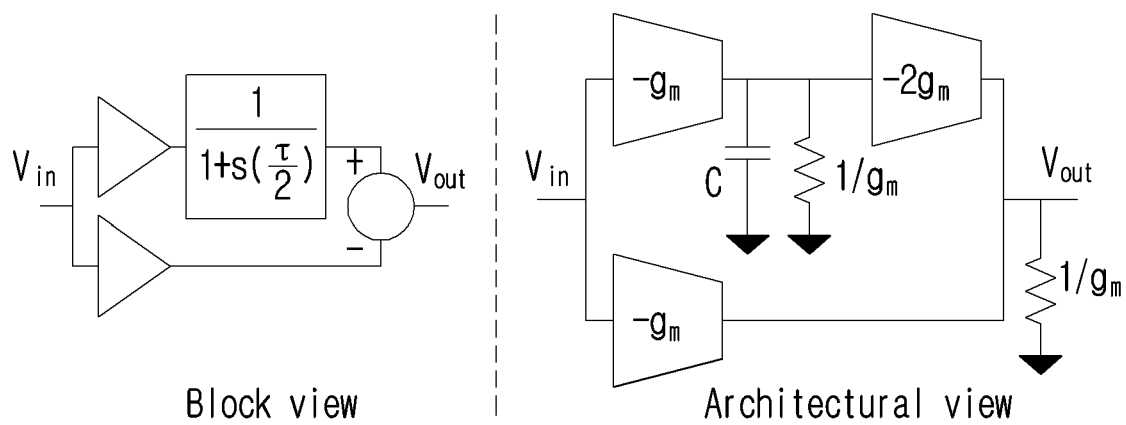
FIG. 7 is a block diagram illustrating a time delay (TD) of an intermediate frequency (IF) band.

FIG. 7 is a block diagram of a TD of an IF band. Unlike the TD of the RF band described above, the time delay may be configured by a Gm value and a capacitance of an active element, and thus, even when a delay time increases, a size does not increase and there is almost no loss.

Accordingly, in an embodiment of the present disclosure, a large area antenna array system uses a TD of an IF band as a solution to implement a long time delay. However, the long time delay has a problem in minutely adjusting a delay time, that is, in achieving a high resolution.

Furthermore, to solve the time delay of all arrays at an IF terminal, a mixer should be added for every array. However, this is very inefficient in configuring an array system.

Accordingly, an embodiment of the present disclosure proposes a method for binding four arrays and processing the same with one IF mixer and one IF band TD, and processing each of the four arrays with a phase adjuster at an RF terminal.

Figure 8:
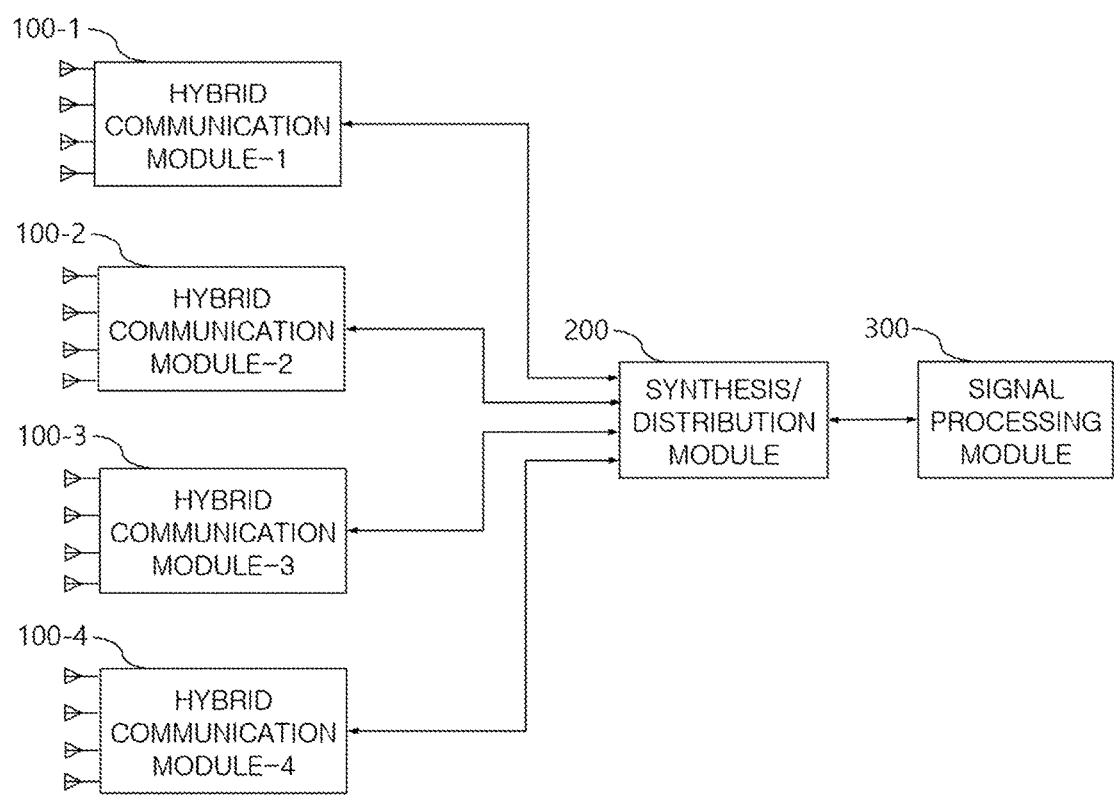
FIG. 8 is a block diagram of an RF/millimeter wave communication system according to an embodiment of the present disclosure.

FIG. 8 is a block diagram of an RF/millimeter wave communication system according to an embodiment of the present disclosure. The communication system according to an embodiment of the present disclosure includes hybrid communication modules 100-1, 100-2, 100-3, and 100-4, a synthesis/distribution module 200, and a signal processing module 300.

The hybrid communication modules 100-1, 100-2, 100-3, and 100-4 are modules for transmitting and receiving signals via a plurality of antennas, and may perform beamforming with respect to broadband large area array antennas.

The synthesis/distribution module 200 may synthesize reception signals outputted from the hybrid communication modules 100-1, 100-2, 100-3, and 100-4 in a reception mode, and may apply the synthesized signal to the signal processing module 300, and, in a transmission mode, may distribute a transmission signal outputted from the signal processing module 300 to the hybrid communication modules 100-1, 100-2, 100-3, and 100-4.

The signal processing module 300 is a module for processing a reception signal and generating a transmission signal.

Figure 9:
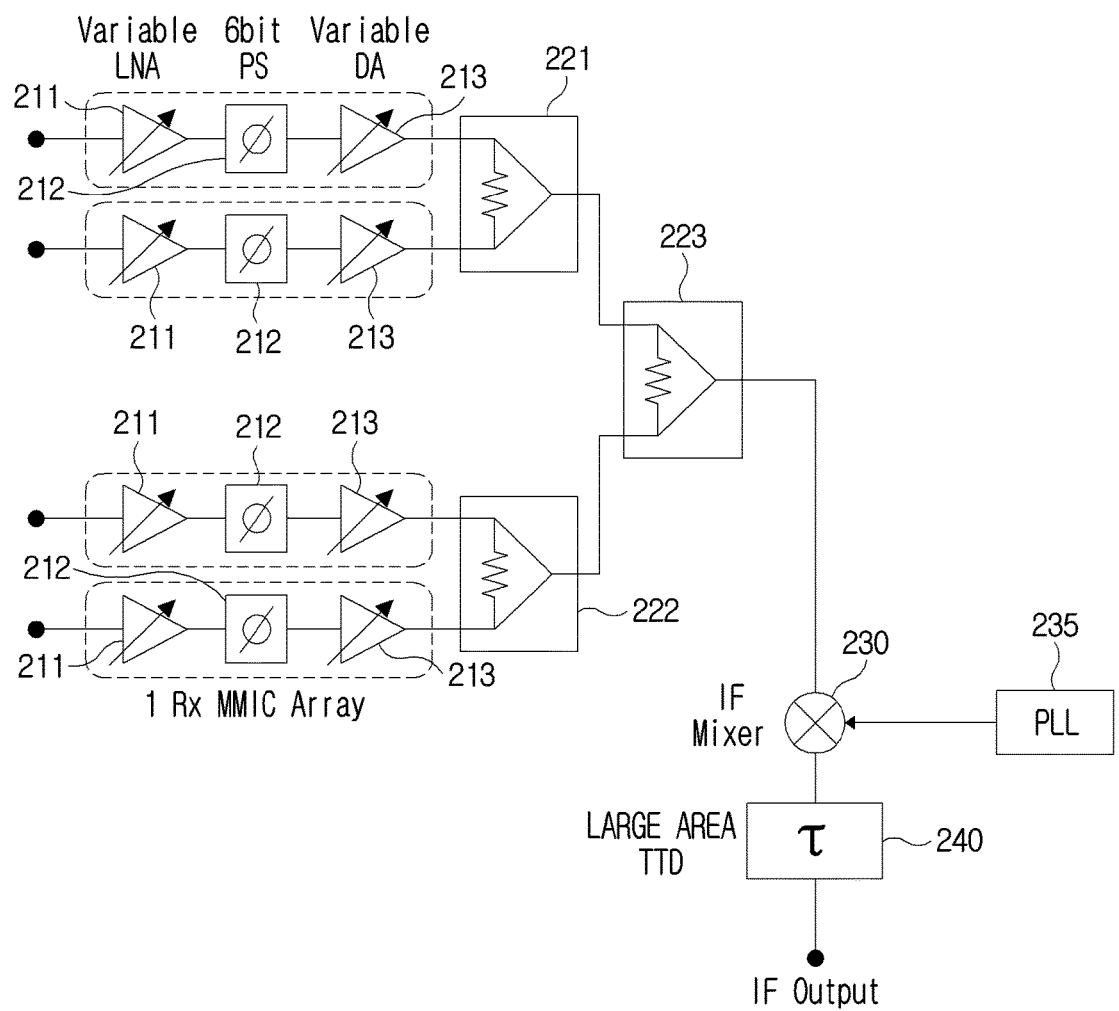
FIG. 9 is a view illustrating a structure of a receiver provided in each of hybrid communication modules.

FIG. 9 is a view illustrating a structure of a receiver provided in each of the hybrid communication modules 100-1, 100-2, 100-3, and 100-4. The receivers of the hybrid communication modules 100-1, 100-2, 100-3, and 100-4 may be implemented to have the same structure, and thus only the receiver of one hybrid communication module is illustrated in FIG. 9.

As shown in FIG. 9, the receiver of each of the hybrid communication modules 100-1, 100-2, 100-3, and 100-4 includes variable low noise amplifiers (LNAs) 211, phase shifters (PSs) 212, variable distribution amplifiers (DAs) 213, synthesizers 221, 222, 223, an IF band mixer 230, a phase-locked loop (PLL) 235, and a time delay (TD) 240.

The variable LNAs 211 may amplify RF signals received from four antennas, the PSs 212 may adjust phases of the RF signals for beamforming, and the variable DAs 213 may amplify the phase-adjusted RF signals again.

The PSs 212 may adjust the phases to perform minute beamforming between adjacent antennas at an RF end.

The synthesizers 221, 222, 223 synthesize the phase-adjusted RF signals into one RF signal. The IF band mixer 230 may down-convert the synthesis signal outputted from the synthesizer 223 into an IF band signal by using a frequency outputted from the PLL 235.

The TD 240 adjusts a delay for the IF signal down-converted at the synthesizer 223. The TD 240 adjusts the delay to perform beamforming between antenna groups at an IF terminal.

Since the delay adjustment at the TD 240 is adjustment between antenna groups, an adjustment width is larger than that in phase adjustment between individual antennas.

Figure 10:
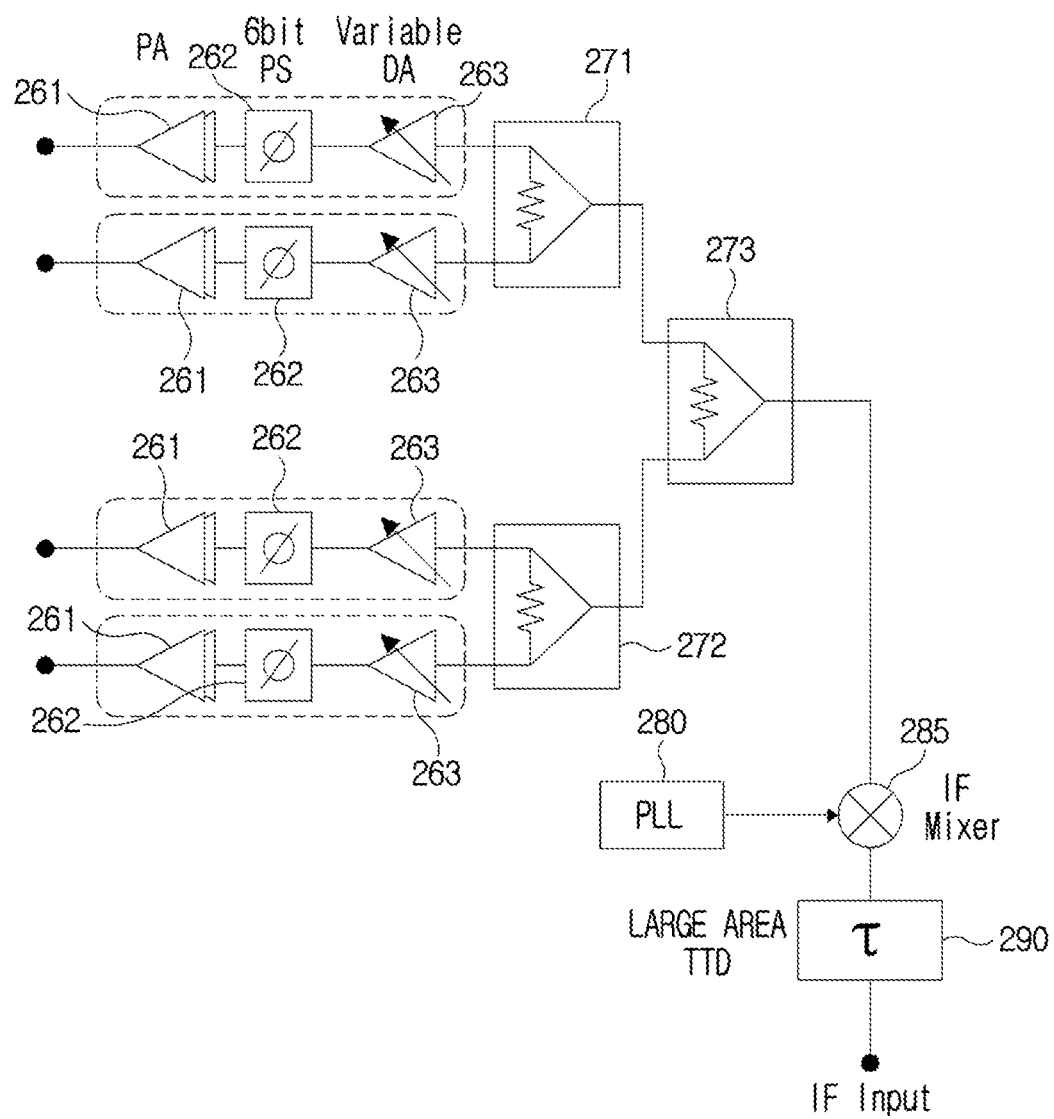
FIG. 10 is a view illustrating a structure of a transmitter provided in each of hybrid communication modules.

FIG. 10 is a view illustrating a structure of a transmitter provided in each of the hybrid communication modules 100-1, 100-2, 100-3, and 100-4. Since the transmitters of the hybrid communication modules 100-1, 100-2, 100-3, and 100-3 may be implemented to have the same structure, only the transmitter of one hybrid communication module is illustrated in FIG. 10.

As shown in FIG. 10, the transmitter of each of the hybrid communication modules 100-1, 100-2, 100-3, and 100-4 may include power amplifiers (PAs) 261, PSs 262, variable DAs 263, distributors 271, 272, 273, a PLL 280, an IF band mixer 285, and a TD 290.

The TD 290 adjusts a delay for an incoming transmission signal of an IF band. The TD 290 adjusts the delay to perform beamforming between antenna groups at the IF terminal.

The IF band mixer 285 up-converts the IF signal the delay of which is adjusted at the TD 290 into an RF band signal by using a frequency outputted from the PLL 280. The distributors 271, 272, 273 distribute the RF signal outputted from the IF band mixer 285 into four RF signals.

The variable DAs 263 may amplify the respective RF signals outputted from the distributors 271, 272, 273, the PSs 262 may adjust phases of the RF signals for beamforming, and the PAs 261 may amplify the phase-adjusted RF signals again and may transmit the signals via the four antennas.

The PSs 262 adjust the phases to perform minute beamforming between adjacent antennas at the RF terminal. Since phase adjustment at the PSs 262 is minute adjustment between individual antennas, an adjustment width is smaller than that in delay adjustment at the TD 290, which is delay adjustment between antenna groups.

As described above, the hybrid communication modules 100-1, 100-2, 100-3, and 100-4 perform beamforming for each individual antenna using the PSs at the RF terminal, and may perform beamforming for each antenna group using the TD at the IF terminal.

A resolution problem of the TD at the IF terminal can be solved by minute phase adjustment through the PSs at the RF terminal. In addition, since the TD is implemented at the IF terminal, the system is applicable to a large area array.

The beam squint phenomenon becomes more serious when the number of arrays increases. Since the small number of PSs (four PSs) are implemented in the embodiment of the present disclosure, the beam squint phenomenon does not frequently occur.

Figure 11A:
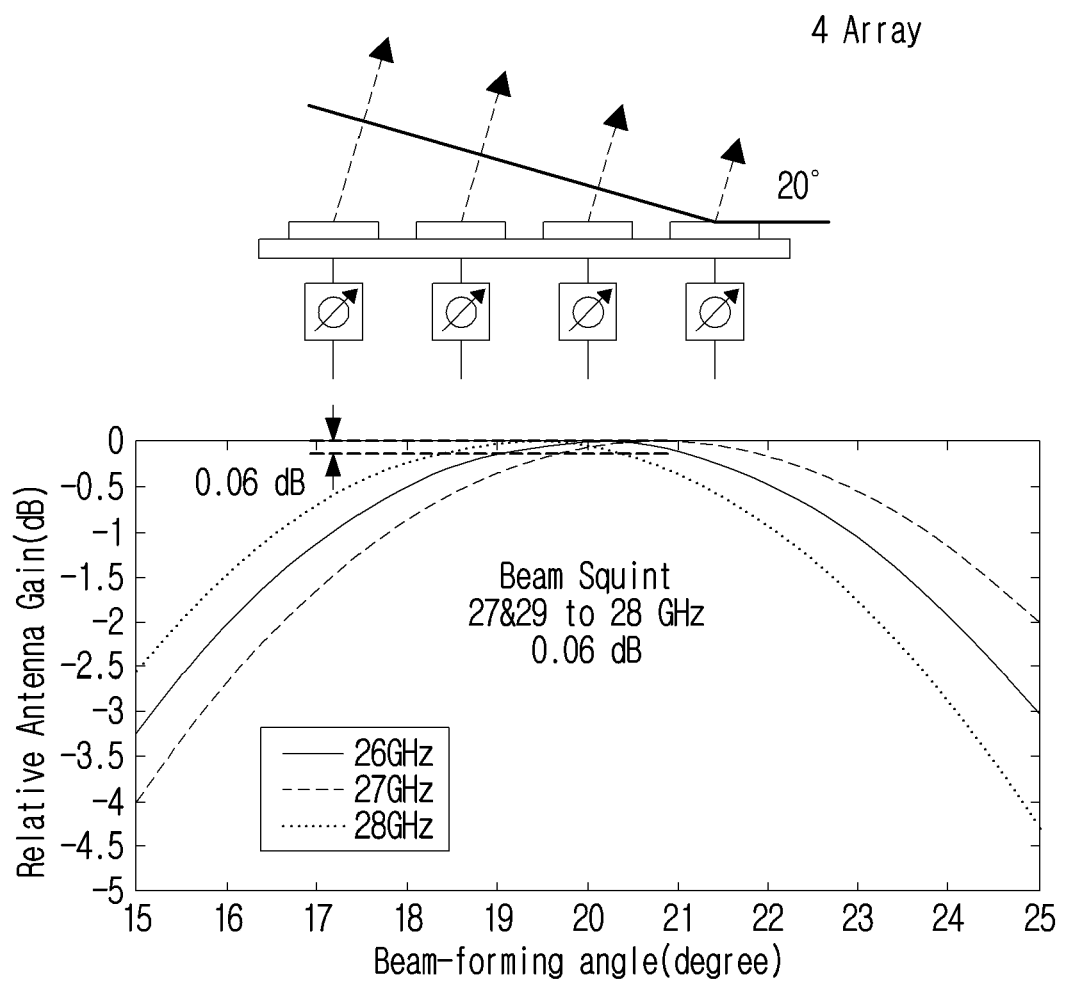
FIGS. 11A and 11B are graphs illustrating analysis of a beam squint phenomenon caused by use of a phase shifter (PS).
Figure 11B:
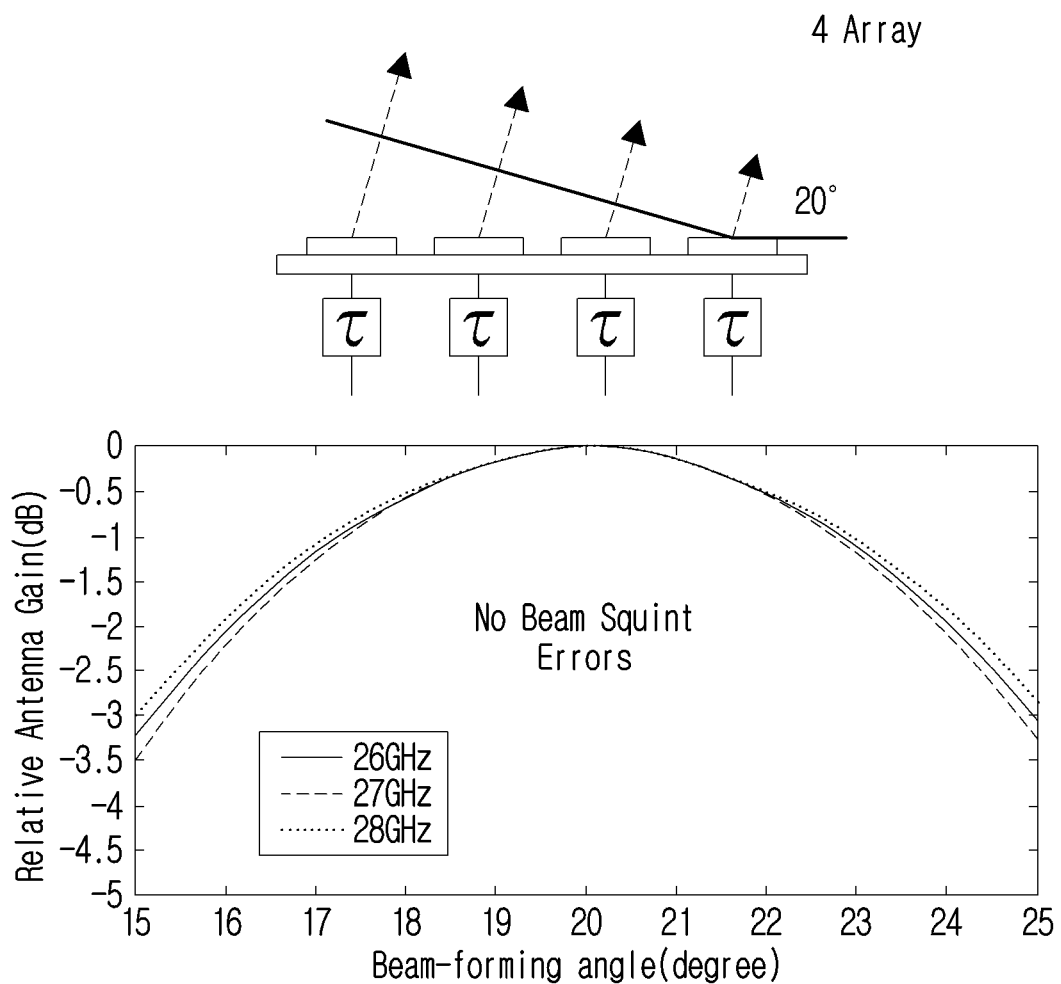

FIGS. 11A and 11B illustrate graphs showing analysis of the beam squint phenomenon when four PSs are used (0.06 dB error) and when four TDs are used (no error). It can be seen from the drawing that the beam squint phenomenon does not matter when PSs are applied to few antennas.

As a result, the communication system according to an embodiment of the present disclosure has various advantages of a large area, a high resolution, a small size, a simple structure, low power, etc.

Up to now, the hybrid type transceiver for the broadband large area beamforming has been described in detail with reference to preferred embodiments.

The communication system according to an embodiment of the present disclosure is the core feature for constituting a beamforming array antenna to be used for 5G mobile communication, and can be generally applied to a large area array system having an increased array area, and a high-speed communication having a broad bandwidth.

In designing a broadband communication system using a large area array antenna, the communication system according to an embodiment of the present disclosure can be simplified by constituting the TD at the IF terminal.

The communication system according to an embodiment of the present disclosure is applicable to mobile communication components, modules, and systems, and in particular, can be utilized for a front end module of 5G mobile communication and is applicable to a broadband phase array system.

While preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A communication device comprising:
    antennas;
    first phase shifters (PSs) configured to adjust respective phases of reception signals received via the antennas;
    a first time delay (TD) configured to adjust delays for the reception signals the phases of which are adjusted at the first PSs; and
    a first synthesizer configured to synthesize received RF signals corresponding to the reception signals,
    wherein the first TD is configured to adjust a delay for a synthesis signal synthesized at the first synthesizer.

2. The communication device of claim 1, wherein the first PSs are provided at an RF terminal to adjust respective phases of the received RF signals.

3. The communication device of claim 1, further comprising a first mixer configured to down-convert the synthesis signal outputted from the first synthesizer into an IF band signal,
    wherein the first TD is configured to adjust a delay for the IF band signal outputted from the first mixer.

4. The communication device of claim 1, wherein an adjustment width at the first TD is larger than adjustment widths at the first PSs.

5. The communication device of claim 1, further comprising:
    a second TD configured to adjust delays for transmission signals; and
    second PSs configured to adjust respective phases of a plurality of transmission signals generated from the transmission signals, and to apply the transmission signals to the antennas.

6. The communication device of claim 5, wherein the second TD is provided at an IF terminal to adjust a delay for an IF signal to be transmitted, and
wherein the communication device further comprises a mixer configured to up-convert the IF signal the delay of which is adjusted at the second TD into an RF signal.

7. The communication device of claim 6, further comprising a distributor configured to distribute the RF signal outputted from the mixer into a plurality of RF signals,
wherein the second PSs are configured to adjust respective phases of the RF signals outputted from the distributor, and to apply the RF signals to the antennas.

8. The communication device of claim 1, wherein the antennas are configured to form an array antenna.

9. A communication method comprising:
receiving, by antennas, signals, respectively;
adjusting, by first phase shifters (PSs), respective phases of reception signals received via the antennas;
adjusting, by a first time delay (TD), delays for the reception signals the phases of which are adjusted at the first PSs; and
synthesizing, by a first synthesizer, received RF signals corresponding to the reception signals,
wherein the adjusting of the delays for the reception signals further includes adjusting a delay for a synthesis signal synthesized at the first synthesizer.

10. The communication method of claim 9, wherein the first PSs are provided at an RF terminal to adjust respective phases of the received RF signals.

11. The communication method of claim 9, further comprising:
performing down-converting, using a first mixer, the synthesis signal outputted from the first synthesizer into an IF band signal; and,
adjusting, using the first TD, a delay for the IF band signal outputted from the first mixer.

12. The communication method of claim 9, wherein an adjustment width at the first TD is larger than adjustment widths at the first PSs.

13. The communication method of claim 9, further comprising:
adjusting, using a second TD, delays for transmission signals; and adjusting, using second PSs, respective phases of a plurality of transmission signals generated from the transmission signals, and applying the transmission signals to the antennas.

14. The communication method of claim 13, wherein the second TD is provided at an IF terminal to adjust a delay for an IF signal to be transmitted, and
wherein the communication method further comprises performing up-converting, using a second mixer, the IF signal the delay of which is adjusted at the second TD into an RF signal.

15. The communication method of claim 14, further comprising:
distributing, using a distributor, the RF signal outputted from the second mixer into a plurality of RF signals,
adjusting, using the second PSs, respective phases of the RF signals outputted from the distributor, and applying the RF signals to the antennas.

16. The communication method of claim 9, wherein the antennas are configured to form an array antenna.

17. A communication device comprising:
phase shifters (PSs) configured to adjust respective phases of reception signals;
a time delay (TD) configured to adjust delays for the reception signals the phases of which are adjusted at the PSs; and
a synthesizer configured to synthesize received RF signals, corresponding to the reception signals, to generate a synthesis signal,
wherein the TD is configured to adjust a delay for the synthesis signal synthesized at the synthesizer.

18. The communication device of claim 17, further comprising:
another TD configured to adjust delays for transmission signals; and
second PSs configured to adjust respective phases of a plurality of signals generated from the transmission signals, and to apply the transmission signals to the antennas.

19. The communication device of claim 18, wherein the other TD is provided at an IF terminal to adjust a delay for an IF signal to be transmitted, and
wherein the communication device further comprises a mixer configured to up-convert the IF signal the delay of which is adjusted at the other TD into an RF signal.

* * * * *